Aug. 10, 1965
J. H. HENDERSON ETAL
3,199,586
RESIDUAL OIL RECOVERY PROCESS USING
WATER CONTAINING A SURFACTANT
Filed May 31, 1961
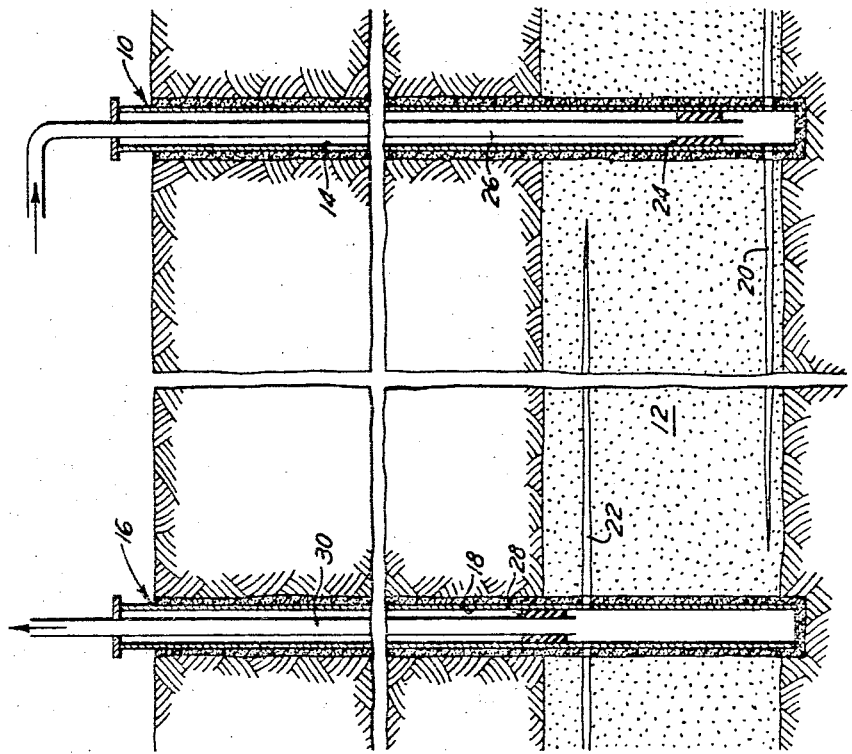
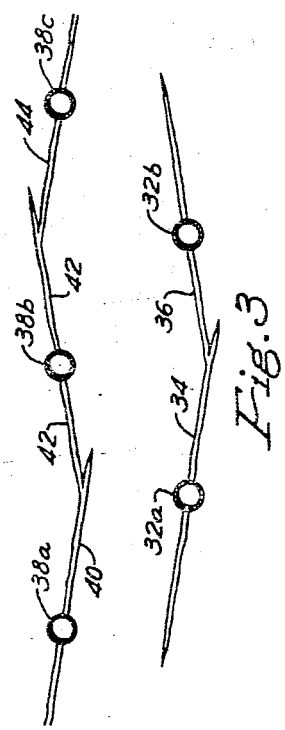
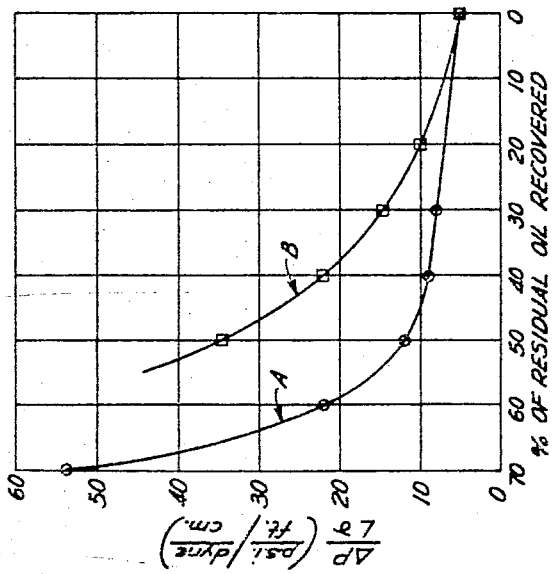
INVENTORS
JAMES H. HENDERSON
JOSEPH J. TABER
BY
ATTORNEY ial Patent Office 3,199,586
Patented Aug. 10, 1965

3,199,586
RESIDUAL OIL RECOVERY PROCESS USING
WATER CONTAINING A SURFACTANT
James H. Henderson, Gibsonia, and Joseph J. Taber,
Cheswick, Pa., assignors to Gulf Research & Development Company, Pittsburgh, Pa., a corporation of
Delaware
Filed May 31, 1961, Ser. No. 113,725
8 Claims. (Cl. 166—9)

This invention relates to a method for the production of oil from underground oil-bearing formations, and more particularly to the secondary recovery of oil from such formations by a water flooding process.

Usually underground oil reservoirs suitable for commercial production of oil originally possess sufficient energy to move oil in the reservoir to wells drilled into the reservoir. The reservoir energy, which may be in the form of a gas cap under an elevated pressure, gas dissolved in the oil, or a water drive, may be adequate to force the oil upwardly through the wells to the surface; although frequently it is necessary to provide pumps to lift the oil from the bottom of the well to the surface. After the production from the reservoir has continued for an extended period, the length of which will depend upon the characteristics of the reservoir, the reservoir may not contain sufficient energy to move oil to the wells at a rate high enough to permit continued profitable operation of the wells. As much as 70% or even more of the oil initially present in the reservoir may remain underground when production by primary recovery is no longer economically feasible and the reservoir is often referred to as depleted.

One secondary method that has been widely used to increase the amount of oil recovered from a depleted reservoir is the water flooding process in which water is injected into the reservoir at one or more wells to drive oil from the reservoir to adjacent wells through which the oil is lifted to the surface. Continued injection of water into the reservoir frequently results in fingering of the water through the oil bank with the consequent production of increasing amounts of water with the oil. Various methods of plugging the most permeable portions of the formation or increasing the viscosity of the water have been suggested to reduce the fingering of the injection water through the reservoir.

Even if fingering of the water injected into the formation is insignificant, substantial amounts of oil are left in the formation when further injection of water in the conventional water flood process causes no further production of oil. At this stage of the operation the oil remaining in the formation, referred to as the residual oil, is present in the formation as a discontinuous phase. An article in the Oil and Gas Journal of May 13, 1957, page 98 et seq., based on extensive studies, shows that the amount of residual oil is independent of the flooding rate and cannot be recovered by further increases in the rate of injection of the water in ranges feasible in oil field flooding operations.

This invention resides in a method for increasing the amount of oil recovered in a water flood operation by injecting water containing a surfactant into a formation in a manner to create a linear drive through the formation. The characteristics of the flood water and the pressure of injection of the flood water are controlled whereby the ratio $$\frac{\Delta P}{L\gamma}$$

is greater than 5.0 where $\Delta P$ is the pressure drop between the injection and production passages through the formation in pounds per square inch, L is the distance in feet between the injection and production passages and $\gamma$ is the interfacial tension in dynes per centimeter between the flood water and the oil in the formation. Throughout this specification all references to the ratio $$\frac{\Delta P}{L\gamma}$$

are in the units stated in the preceding sentence. The term passages is used to designate channels, such as fractures or laterally extending shafts, communicating with the borehole of a well and offering little resistance to the flow compared to the resistance to flow of the oil-bearing formation.

FIGURE 1 is a graph showing the relationship between the percent of residual oil removed from a core of Berea sandstone and the ratio of $$\frac{\Delta P}{L\gamma}$$

FIGURE 2 is a diagrammatic view, partially in vertical section, of an injection and a production well provided with overlapping horizontal fractures for a linear flow water flooding operation utilizing this invention.

FIGURE 3 is a diagrammatic view in horizontal section through the oil-bearing formation of an oil field in which injection wells are connected by vertical fractures and production wells are connected by other vertical fractures for performing a linear water flood operation in accordance with this invention.

We have found that the recovery of residual oil from a formation is dependent on the ratio of $$\frac{\Delta P}{L\gamma}$$

which must exceed a critical value. By suitable arrangement of flow passages in the oil-bearing formation, a linear flood pattern can be obtained which results in a substantially uniform pressure gradient $$\frac{\Delta P}{L\gamma}$$

over the portion of the formation flooded, whereby, upon reduction of the interfacial tension by the addition of a suitable surfactant to the flood water, the critical ratio of $$\frac{\Delta P}{L\gamma}$$

can be exceeded throughout the area of the formation that is flooded without resorting to flood rates or injection pressures out of the range of feasible economic practices.

Referring to FIGURE 1 in which the percent of residual oil removed from a core of Berea sandstone by water flooding with aqueous solutions is plotted against the ratio $$\frac{\Delta P}{L\gamma}$$

it will be noted that substantially none of the residual oil is removed from the core until $$\frac{\Delta P}{L\gamma}$$

exceeds about 5.5, the critical value for the Berea sandstone. The minimum ratio of $$\frac{\Delta P}{L\gamma}$$

that will allow recovery of a measurable amount of residual oil from the formation will vary from one formation to another. In some formations substantially no residual oil is recovered unless $$\frac{\Delta P}{L\gamma}$$

exceeds about 8.

In all of the formations that have been tested the ratio of $$\frac{\Delta P}{L\gamma}$$

required for the production of a measurable portion of the residual oil exceeds 5. Below the critical ratio of $$\frac{\Delta P}{L\gamma}$$

only insignificant amounts of residual oil are removed and an increase in the ratio of $$\frac{\Delta P}{L\gamma}$$

causes substantially no increase in the amount of oil recovered. Once the critical $$\frac{\Delta P}{L\gamma}$$

ratio is exceeded, further increases in that ratio cause recovery of large additional amounts of residual oil. It is preferred that the ratio of $$\frac{\Delta P}{L\gamma}$$

exceed about 20 in which event 50% or more of the residual oil will be flushed from the majority of oil-bearing formations.

Although the critical ratio of $$\frac{\Delta P}{L\gamma}$$

depends upon the characteristics of the formation from which oil is to be recovered, it is independent of the fluid to be displaced from the formation or the displacing fluid. Experimental runs were made in Berea sandstone in which residual air was displaced with water, residual air was displaced with aqueous surfactant, residual Soltrol (a mixture of hydrocarbons of narrow boiling range similar in density and viscosity to kerosene) was displaced with water, residual Soltrol was displaced with an aqueous solution of isopropyl alcohol, and residual Soltrol was displaced with an aqueous surfactant. The runs were made by saturating cores of the sandstone with water, flooding them with the fluid to be displaced, and then flooding with water by imbibition until no further oil or other fluid was recovered before flooding with the displacing fluid to be tested. Flooding by imbibition is an effective method of reducing the residual oil in a core to as low a value as will remain after flooding water at rates feasible in field operations. The cores were flooded with the displacing fluid at very low rates and the rates gradually increased. No appreciable residual fluid was displaced from the Berea sandstone until $$\frac{\Delta P}{L\gamma}$$

exceeded about 5.5 p.s.i./ft./dyne/cm. Any small increase of $$\frac{\Delta P}{L\gamma}$$

above 5.5 always produced a marked increase in the residual fluid displaced.

As shown in FIGURE 1, although the critical ratio of $$\frac{\Delta P}{L\gamma}$$

is independent of the displaced and displacing fluid, the amount of oil recovered at ratios above the critical depends on the displacing fluid used. In FIGURE 1, curve A shows the residual oil recovered when a core containing residual oil (Soltrol) is flooded with a 0.1% aqueous solution of Triton X-100, an alkyl polyoxyethylene derivative of phenol sold by Rohm and Haas, and curve B when a similar core is flooded with an aqueous solution containing 20% isopropyl alcohol. In every instance the critical ratio is approximately 5:5, but the recovery of residual oil varied widely at higher ratios with the different flooding liquids.

The interfacial tension between the oil and untreated fresh water or brine is too high to allow a $$\frac{\Delta P}{L\gamma}$$

to exceed the critical ratio unless pressure gradients greatly exceeding those feasible in field operations are employed. Regardless of the flow pattern, flooding with untreated fresh water or brine at feasible field conditions will not result in production of residual oil from a formation which has been water flooded. The interfacial tension between fresh or salt water and a crude oil is usually in the range of about 25 dynes per centimeter and with the usual spacing of oil wells in a field the desirable range of $$\frac{\Delta P}{L\gamma}$$

of 20 percent be obtained without the use of excessive pressures or flow rates. Interfacial tensions between Soltrol and fresh or salt water is in the range of 40 to 50 dynes per centimeter.

By incorporating a surfactant in the flood water the interfacial tension between the flood water and the oil can be reduced to a value at which reasonable pressure gradients readily obtained in linear drive field operations, as hereinafter described, will result in removal of residual oil from an oil-bearing formation in a water flooding operation. The surfactant incorporated in the flood water should reduce the interfacial tension between the flood water and the oil to below 0.5 dyne per centimeter and preferably below 0.2 dyne per centimeter. Certain surfactants and combinations of surfactants with alkali metal hydroxides or with brine allow the interfacial tension between the oil and the flooding medium to be reduced to the still more desirable range of 0.05 dyne per centimeter or less.

Among the many surfactants suitable for use in this invention are the nonionic surface active agents which are ordinarily polyoxyethylene derivatives of water insoluble organic compounds. Typical water insoluble organic compounds, generally referred to as the hydrophobic group of the surfactants, which are treated with ethylene oxide to form the polyoxyethylene derivatives, are fatty alcohols, alkyl substituted phenols, fatty acids, rosin acids, and tall oils. Other nonionic surface active agents are the esters of the hexahydric alcohols such as sorbitan monooleate and monopalmitate, the polyoxyethylene derivatives of the fatty acid esters of hexahydric alcohols, and ethers of hexahydric alcohols and ethylene oxide.

The effect of a number of nonionic surface active agents on interfacial tension is illustrated in Table I. Atpet 931, manufactured by Atlas Powder Company, is sorbitan monooleate. Pluronics L-64 and L-62 (Wyandotte Chemical Company) are polyoxypropylene-polyoxyethylene glycols, the former having a molecular weight of 2900 and the latter a molecular weight of 2500.

TABLE I

*The effect of nonionic surface-active agents on the interfacial tension between various oils and water*

| Surfactant | Interfacial Tension, dynes/cm. | Surfactant Concentration, Percent | Oil Phase | Water Phase |
|---|---|---|---|---|
| Triton X-100 | 0.3 | 10.0 | W. M. Smith crude. | Oil field brine. |
| Pluronic L-64 | 0.5 | 1.0 | Soltrol | 5% brine. |
| Pluronic L-62 | 0.5 | 1.0 | ___do___ | Do. |
| Atpet 931 | 0.5 | 1.0 | ___do___ | 2.5% brine. |

The interfacial tension between a hydrocarbon crude oil and water containing a surfactant frequently can be further reduced by the addition of small amounts, up to about 5.0%, of sodium hydroxide. For example, the interfacial tension between a crude oil and an aqueous solution of Triton X-100, a polyoxyethylene derivative of diisobutyl phenol containing nine or ten ethylene oxide groups per molecule, can be markedly reduced by the addition of sodium hydroxide. The effect on interfacial tension between crude oil and aqueous solutions of adding sodium hydroxide to different aqueous solutions of Triton X-100 is illustrated in Table II.

TABLE II

*The effect of sodium hydroxide on the interfacial tension between N. Ward Estes crude oil and 10% Triton X-100*

| Sodium Hydroxide Concentration, Percent | Interfacial Tension, dynes/cm. |
|---|---|
| 0.00 | 0.50 |
| 0.001 | 0.46 |
| 0.01 | 0.41 |
| 0.1 | 0.31 |
| 1.0 | 0.24 |
| 4.0 | 0.14 |

Anionic surfactants are also suitable for use in the water flooding process of this invention to reduce the interfacial tension between oil and the surfactant-treated flood water to the desired range. The anionic surfactants are usually alkylaryl sulfonates or fatty alcohol sulfates. Surfactants such as Solar 25, a mixed nonionic and anionic surfactant manufactured by Swift & Company, can be used to reduce the interfacial tension to the desired range. The nonionic detergent in Solar 25 is diethanolamide of fatty acids from coconut oil. The major part of the amide has the formula:

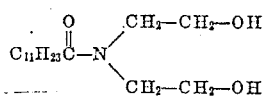

The anionic portion is the diethanolamine salt of dodecyl benzene sulfonic acid. In addition, some free amine and glycerin are found in the detergent so that the total composition is:

|  | Percent |
|---|---|
| Diethanolamide | 60 |
| Amine sulfonate | 26 |
| Free diethanolamine | 8 |
| Free glycerin | 6 |

The interfacial tension between hydrocarbon oils and some aqeous solution of mixed nonionics-anionics are set forth in Table III.

TABLE III

*The effect of anionic or mixed anionic-nonionic surfactants on the interfacial tension between oil and water*

| Surfactant | Interfacial Tension, dynes/cm. | Surfactant Concentration, Percent | Oil Phase | Water Phase |
|---|---|---|---|---|
| Triton GR-5 [1] | 0.025 | 0.1 | Soltrol | 2.5% brine. |
| Triton GR-7 [2] | <0.1 | 0.1 | ___do___ | Do. |
| Mona Wet MO 70K.[3] | 0.08 | 1.0 | ___do___ | Distilled. |
| Mona Wet MM 80.[4] | 0.1 | 1.0 | ___do___ | 5% brine. |
| Solar 25 | 0.2 | 1.0 | ___do___ | Distilled. |
| Do | 0.2 | 0.1 | N. W. Estes crude. | 2.5% brine. |
| Do | 0.1 | 1.0 | W. M. Smith (Oklahoma). | Oil field brine. |
| Triton GR-5 +Pluronic L-62. | 0.035 | 0.01 | Soltrol | 2.5% brine. |

[1] 60% solution of sodium dioctyl sulfosuccinate in equal parts isopropanol and water.
[2] 64% solution of sodium dioctyl sulfosuccinate in a light petroleum distillate solvent.
[3] Potassium dioctyl sulfosuccinate.
[4] Sodium dihexyl sulfosuccinate.

A preferred surfactant used in the process of this invention is Triton GR-5, manufactured by Rohm and Haas. Interfacial tensions between Soltrol and water containing Triton GR-5 of the order of 0.025 dyne per centimeter can be obtained when the surfactant is employed in a brine solution. Triton GR-5 has the unique property of causing lower interfacial tensions between brine and Soltrol with increasing salt concentrations in the brine. The effect of increasing brine concentrations on the surface tension of water containing 0.1% and 0.5% Triton GR-5 is illustrated in Table IV.

TABLE IV

| Percent Triton GR-5 | Percent NaCl | $\gamma$, dynes/cm. |
|---|---|---|
| 0.1 | 0.1 | 0.86 |
| 0.1 | 0.3 | 0.26 |
| 0.1 | 1.0 | 0.07 |
| 0.1 | 2.5 | 0.025 |
| 0.5 | 0.1 | 0.96 |
| 0.5 | 0.25 | 0.35 |
| 0.5 | 1.0 | 0.06 |
| 0.5 | 2.5 | 0.025 |

The cationic surfactants can also be used to reduce the interfacial tension to the desired range, but in general are not as desirable for this purpose as the nonionic or anionic surfactants because the cationic surfactants tend to be adsorbed on the surface of the formation rock. Suitable cationic surfactants for causing the desired low interfacial tension are DH 1080 and Hyamine 2389 manufactured by Rohm and Haas. These surfactants will reduce the oil-water interfacial tension to 0.4 and 0.5 dyne/cm., respectively, at 0.5% concentrations. Cationic surfactants are usually quaternary ammonium chloride salts with one or two long alkyl-aryl groups on the nitrogen atom to impart the oil-water interfacial activity. For example, Hyamine 2389 is a mixture of alkyl tolyl methyl trimethyl ammonium chloride with the alkyl group ranging from $C_9H_{19}$ to $C_{15}H_{31}$ and an average molecular weight of 331.

Any of the surfactants mentioned above are suitable if they reduce the interfacial tension between the water and oil to the desired range. The surfactant can be used in any concentrations up to about 10% of the aqueous solution which will provide the desired low interfacial tension. The upper limit of concentrations is usually determined by economic considerations, but in some instances the higher concentrations form cloudy suspensions or cause emulsions which tend to plug the formations. Injection of high concentrations of surfactant in water in a slug at the beginning of the flood has the advantage of reducing the lag of the surfactant behind the flood front.

Examples of the flooding of a core with aqueous surfactants for the recovery of residual oil from the core are presented below.

EXAMPLE 1

A cylindrical Berea sandstone core, 4.51 centimeters long and having a cross sectional area of 5.06 square centimeters, was saturated with a brine solution containing 2½% sodium chloride. Following the saturation with the brine solution, the core was flooded with Soltrol until no further brine was driven from the core. Following the Sotrol flood, the core was then flooded with 2½% brine at a rate below a $$\frac{\Delta P}{L\gamma}$$

ratio of 5 until no further oil was recovered, thereby leaving residual oil in the core. An aqueous surfactant solution containing 0.25% Triton GR-5 and 2.5% sodium chloride was then forced through the core. The surfactant solution had an interfacial tension with the Soltrol of 0.07 dyne/cm. A pressure of 0.40 pound per square inch was applied to the surfactant solution at the inlet end of the core resulting in a $$\frac{\Delta P}{L\gamma}$$

of 38.2. The results are presented in the following Table VI.

In Tables V and VI, the terms $S_O$, $S_{or}$, and $S_W$ refer to the volume of oil, residual oil, and water, respectively, in the core at the end of the step. The term cc. refers to the volume of the liquid in cubic centimeters and percent$V_p$ refers to the volume of the liquid in terms of the pore volume of the core.

TABLE V

*Berea core No. B-21*

| Process Completed | Oil Production | | Core Saturation | | | |
|---|---|---|---|---|---|---|
| | | | So | | Sw | |
| | Cc. | Percent $V_P$ | Cc. | Percent $V_P$ | Cc. | Percent $V_P$ |
| Saturated with 2.5% NaCl | | | | | 5.3 | 100 |
| Soltrol Flood | | | 2.94 | 55.5 | 2.36 | 44.5 |
| Brine Flood | 0.98 | 18.5 | 1.96 | 37 | 3.34 | 63 |
| Flood of 0.25% GR-5 in 2.5% NaCl | ¹ 1.99 | 38 | 0.00 | 0.00 | 5.3 | 100 |

¹ The oil production of 1.99 cc. indicates substantially complete removal of oil from the core, within the accuracy of the measurements.

EXAMPLE 2

A Berea sandstone core, one inch in diameter and 2.32 centimeters long, was saturated with a brine solution containing 2½% sodium chloride. The core was then flooded with N. Ward Estes Crude Oil after which it was flooded with brine at a $$\frac{\Delta P}{L\gamma}$$

ratio below 5 until no further oil was removed from the core. An aqueous solution containing 1.0% Solar 25 and 2.5% sodium chloride, and having an interfacial tension with the crude of 0.4 dyne per centimeter, was forced through the core by the application of a pressure of 1.2 p.s.i. at the inlet end of the core. The ratio of $$\frac{\Delta P}{L\gamma}$$

for the test was 37.5. The results of the flood are presented in Table VI.

TABLE VI

| Process Completed | Oil Production | | Core Saturations | | | |
|---|---|---|---|---|---|---|
| | | | So | | Sw | |
| | Cc. | Percent $V_P$ | Cc. | Percent $V_P$ | Cc. | Percent $V_P$ |
| | Plug from Long Berea Core | | | | | |
| Saturated with 2.5% NaCl | | | | | 2.59 | 100.00 |
| Crude Oil Flood | | | 1.67 | 64.5 | 0.92 | 35.5 |
| Brine Flood | 0.80 | 30.9 | 0.87 | 33.6 | 1.72 | 66.4 |
| Flood of 1 Pore Volume of Solar 25 Followed by Brine | ¹ 0.52 | 20.0 | 0.35 | 13.5 | 2.24 | 86.5 |

¹ 60% of Sor.

Laboratory results on the flooding of cores are of little value for application to the flooding of oil fields unless a proper correction is made for the high pressure gradients that are ordinarily employed in the laboratory work. Comparable pressure gradients cannot be obtained in the flooding operations as they have been performed in oil fields. In addition to reducing the interfacial tension between the oil and flood water to the desired low range below 0.2 dyne/centimeter, it is essential to control the flood pattern to obtain a linear drive to obtain $$\frac{\Delta P}{L\gamma}$$

ratios high enough to cause substantial production of residual oil. Conditions existing in oil fields having ordinary well spacing, regardless of whether the flood is the usual five spot flood pattern or a line drive pattern in which the injection of the flood water is at a number of wells in a line, require flood rates or injection pressures higher than can practicably be obtained. The chart in the Transactions of the A.I.M.E., Vol. 103, 1933, page 230, shows that a major portion of the area flooded in a five spot pattern is subjected to a pressure gradient approximately one-fourth of the average pressure gradient between the injection and production wells and less than $\frac{1}{16}$ of the pressure gradient occurring in the distance from the injection well in which the first 20% of the pressure drop occurs. In order to subject the entire flooded area to a pressure gradient adequate to produce the critical $$\frac{\Delta P}{L\gamma}$$

ratio, the pressure gradient between injection and production wells must be approximately four times that required to produce the critical $$\frac{\Delta F}{L\gamma}$$

Hence, reduction of the interfacial tension between the flood water and the oil in the formation is not alone sufficient to eliminate the necessity of the excessive flood rates mentioned in the Oil and Gas Journal article, supra.

It is possible to have a substantially uniform pressure gradient through the flooded formation and avoid the very high pressure gradient over a portion of the formation that would be required to exceed the critical $$\frac{\Delta P}{L\gamma}$$

ratio in processes of the prior art by employing a true linear drive. The term "linear drive" is herein used in distinction to the ordinary line drive process to designate a process in which the areas of the formation exposed to open passages from the injection well and the production well are of the same order of magnitude as the area in the formation swept by the flood water perpendicular to the direction of flow of the flood water. The area of the passages should exceed about 10% of the area of the formation perpendicular to the direction of flow. In the ordinary line drive process the area of the passages is equal to the exposed area of the borehole wall of the well which is only a very small fraction, less than about 0.5%, depending upon the well spacing, of the area of the formation perpendicular to the direction of flow.

Several methods are available for obtaining the desired linear flow pattern. Referring to FIGURE 2 of the drawings, an injection well, indicated generally by reference numeral 10, is drilled through a producing formation 12 from which oil is to be recovered by the water flooding process of this invention. For purposes of illustration, casing 14 is set in well 10 completely through the oil-bearing zone 12 and is cemented in place in accordance with conventional practice. A production well 16 spaced from the injection well 10 a distance determined by the usual considerations in oil field development is drilled into the oil-bearing formation 12 and casing 18 is set in accordance with conventional practice.

A horizontal ring is cut through the casing 14 in the lower portion of the oil-bearing formation 12 and a large horizontal fracture 20 is made to extend from the well 10 in the lower portion of the oil-bearing formation 12. Fracture 20 can be made by suitable modification of the process described in United States Patent No. 2,699,212 to cut a horizontal notch in the formation at the location of the section milled from casing 14 and thereafter pumping a suitable fracturing fluid into the formation at a pressure high enough to cause a fracture. The pumping of the fracturing fluid is continued for a period and at a rate adequate to extend the fracture to the vicinity of well 16. The fracture 20 is propped open by a propping agent pumped into the fracture either during or subsequent to the formation of the fracture.

A section is milled from the casing 18 of well 16 in the upper portion of the oil-bearing formation 12 in the manner described for well 10. A large horizontal fracture 22 is formed in the upper portion of the oil-bearing formation extending from the cut out section of casing 18 of well 16 in a manner similar to that described for fracture 20. Fracture 22, like fracture 20, is propped open with a suitable propping agent to form a fracture of high flow capacity extending from well 16.

Following the formation of fracture 20 a packer 24 is set in well 10 above the level of the fracture 20 and tubing 26 run through the packer. Similarly, a packer 28 is set in well 16 above fracture 22 and tubing 30 run through packer 28. Flood water treated with a surfactant to give an interfacial tension between the oil in the formation and the flood water less than 0.5 dyne/centimeter and preferably less than 0.2 dyne/centimeter is delivered through tubing 26 and fracture 20 into the formation 12 at a pressure adapted to cause a $$\frac{\Delta P}{L\gamma}$$

where L is the vertical distance between fractures 20 and 22 in feet, preferably in excess of 20. Oil flooded from the formation 12 is delivered into the fracture 22, through that fracture into well 16, and the oil can then be lifted to the surface either by the pressure exerted on the flood water or by the provision of a suitable pump in well 16.

In the embodiment of the invention illustrated in FIGURE 3 of the drawings, a plurality of injection wells 32a and 32b are interconnected in the oil-bearing formation by vertical fractures 34 and 36. Spaced from the injection wells 32a and 32b are production wells 38a, 38b, and 38c. Interconnecting vertical fractures 40, 42, and 44 through the oil-bearing formation penetrated by the injection and production wells connect the production wells in a line generally parallel to the fractures 34 and 36 connecting the injection wells. The vertical fractures connecting the injection wells and those connecting the production wells can be made by the process described in United States Patent No. 2,699,212.

Oil is produced from the formation by pumping an aqueous surfactant solution into injection wells 32a and 32b. The surfactant solution flows outwardly through vertical fractures 34 and 36 and from those fractures into the exposed face of the formation. The rate of pumping the aqueous surfactant solution is adjusted to maintain the ratio of $$\frac{\Delta P}{L\gamma}$$

where L is the distance between the interconnecting fractures joining the injection wells 32a and 32b and the interconnecting fractures joining the production wells 38a, 38b, and 38c, above the critical value and preferably above 20. Residual oil in the formation is driven by the surfactant flood into the fractures 40, 42, and 44 and through the production wells 38a, 38b, and 38c through which the oil is lifted to the surface.

The wells illustrated in FIGURE 3 of the drawings are arranged in the usual pattern which results in a five-spot flood pattern in secondary recovery operations. A comparison of the linear drive described with reference to FIGURE 3 and a conventional five-spot flood pattern illustrates the advantages of the applicants' invention.

Assuming a well spacing of ten acres per five-spot pattern, the wells in each row will be 666 feet apart. The distance between adjacent rows is one-half the well spacing or 333 feet which is also the average distance between the fractures connecting the injection wells and the fractures connecting the production wells in FIGURE 3. If a five-spot flood pattern were used, water injected in well 32a would flow to well 38a or well 38b, which are 467 feet from the well 32a. Assuming flooding a formation with a pore size distribution similar to Berea sandstone with an aqueous surfactant solution which has an interfacial tension with the oil in the formation of 0.1 dyne/centimeter at a maximum pressure of 800 pounds per square inch, approximately 50% of the residual oil can be recovered in the linear drive process while no residual oil can be recovered in the five-spot pattern, as illustrated by the following Table VII.

TABLE VII

| | Normal ten-acre, five-spot | Ten-acre, five-spot converted to linear pattern |
|---|---|---|
| Depth, ft | 1,000 | 1,000 |
| Maximum Pressure permitted without fracturing reservoir, p.s.i | 800 | 800 |
| Average p.s.i./ft. obtainable | 800/467=1.7 | 800/330=2.42 |
| P.s.i./ft. in major part of pattern | 1.7/4=0.425 | 2.42 |
| ΔP/Lγ (if γ=0.1 dyne/cm.) | 4.25 | 24.5 |
| Additional oil recovered (Percent of residual) | None | (¹) |

¹ 50% or more.

We claim:
1. A water flooding process for the recovery of residual oil from an underground oil-bearing formation having an injection well and a production well spaced from the injection well penetrating the formation comprising forming a first passage extending into the oil-bearing formation from the injection well, forming a second passage extending into the oil-bearing formation from the production well, said first and second passages being substantially parallel, injecting an aqueous dispersion of a surfactant from the injection well into the formation at a pressure whereby the pressure differential in pounds per square inch between the first and second passages per foot of distance between the passages divided by the interfacial tension in dynes per centimeter between the oil in the formation and the aqueous dispersion exceeds about 5 displacing said dispersion through the formation to drive oil through the formation to the production well, the area of the formation exposed to each of said first and second passages being at least 1/10 of the area swept by the aqueous dispersion measured perpendicular to the direction of flow of the aqueous dispersion, and producing oil through the production well.

2. A process as set forth in claim 1 in which the interfacial tension between the oil in the formation and the aqueous dispersion of a surfactant is less than .2 dyne/centimeter.

3. A process as set forth in claim 1 in which the ratio of the pressure differential in pounds per square inch between the first and second passages per foot of distance between the passages divided by the interfacial tension in dynes per centimeter between the oil in the formation and the aqueous dispersion exceeds about 20.

4. A process as set forth in claim 1 in which the aqueous surfactant dispersion contains at least about 2% sodium chloride and the surfactant is a sodium dioctyl sulfosuccinate.

5. A process as set forth in claim 1 in which the first passage is a substantially horizontal fracture at one level in the oil-bearing formation and the second passage is a substantially horizontal fracture at a different level in the oil-bearing formation than the first fracture.

6. A process as set forth in claim 1 in which the first passage is a substantially vertical fracture extending from the injection well in the oil-bearing formation and the second passage is a substantially vertical fracture extending from the production well in the oil-bearing formation.

7. A process as set forth in claim 1 in which the aqueous dispersion is an aqueous dispersion of a nonionic surfactant and contains sodium hydroxide in concentrations up to about 5%.

8. A water flooding process for the recovery of residual oil from an underground oil-bearing formation penetrated by a series of injection wells in a substantially straight line and a series of production wells spaced from the injection wells in a substantially straight line parallel to a line joining the injection wells comprising forming a series of vertical fractures connecting the injection wells to form a first passage for the injection of flood water, forming interconnecting vertical fractures from the production wells in the oil-bearing formation to form a second passage substantially parallel to the first passage, injecting an aqueous dispersion of a surfactant into the injection wells whereby the aqueous dispersion flows into the first passage into the formation to drive oil through the formation concurrently with the aqueous dispersion toward the second passage, displacing the dispersion through the formation to the second passage under a pressure such that the pressure differential in pounds per square inch between the first and second passages per foot of distance between the passages divided by the interfacial tension in dynes per centimeter between the oil in the formation and the aqueous dispersion exceeds about 5, said aqueous dispersion having an interfacial tension with the oil less than about 0.2 dyne/centimeter, each of said first and second passages exposing an area of the formation at least 1/10 the area swept by the aqueous dispersion measured perpendicular to the direction of flow of the aqueous dispersion, and producing oil through the production wells.

References Cited by the Examiner

UNITED STATES PATENTS

| | | | |
|---|---|---|---|
| 1,651,311 | 11/27 | Atkinson | 166—9 |
| 2,792,894 | 5/57 | Graham et al. | 166—9 X |
| 2,862,556 | 12/58 | Tek | 166—10 |
| 2,952,319 | 9/60 | Popham | 166—35 |
| 2,966,346 | 12/60 | Huitt et al. | 166—42.1 X |
| 3,006,411 | 10/61 | Holbrook | 166—9 |

OTHER REFERENCES

Moore, T. F., and Blum, H. A.: "Wettability in Surface-Active Agent Water Flooding," Oil and Gas Journal, Dec. 8, 1952, pp. 108, 109, 111.

CHARLES E. O'CONNELL, *Primary Examiner.*

UNITED STATES PATENT OFFICE
CERTIFICATE OF CORRECTION

Patent No. 3,199,586

August 10, 1965

James H. Henderson et al.

It is hereby certified that error appears in the above numbered patent requiring correction and that the said Letters Patent should read as corrected below.

Column 4, line 14, for "5:5" read -- 5.5 --; line 36, for "percent" read -- cannot --; column 5, line 74, for "aqeous" read -- aqueous --; column 8, lines 55 to 57, for the ratio reading $$\frac{\Delta F}{L\gamma} \quad \text{read} \quad \frac{\Delta P}{L\gamma}$$

column 10, line 43, for "can be" read -- is --.

Signed and sealed this 22nd day of February 1966.

(SEAL)
Attest:

ERNEST W. SWIDER
Attesting Officer

EDWARD J. BRENNER
Commissioner of Patents